United States Patent
Kobayashi

(10) Patent No.: US 9,321,430 B2
(45) Date of Patent: Apr. 26, 2016

(54) SEATBELT FASTENING STATE DISPLAY DEVICE

(71) Applicant: Yazaki Corporation, Minato-ku, Tokyo (JP)

(72) Inventor: Ryo Kobayashi, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 14/488,593

(22) Filed: Sep. 17, 2014

(65) Prior Publication Data
US 2015/0084763 A1 Mar. 26, 2015

(30) Foreign Application Priority Data
Sep. 26, 2013 (JP) ................. 2013-200255

(51) Int. Cl.
*B60Q 1/00* (2006.01)
*B60R 22/48* (2006.01)
*G08B 5/26* (2006.01)

(52) U.S. Cl.
CPC . *B60R 22/48* (2013.01); *G08B 5/26* (2013.01); *B60R 2022/4816* (2013.01); *B60R 2022/4858* (2013.01); *B60R 2022/4866* (2013.01)

(58) Field of Classification Search
CPC .............. B60R 2022/4816; B60R 2022/4858; B60R 2022/4866; B60R 22/48; G08B 5/36
USPC ............. 340/457.1, 5.72, 441, 438, 457, 468, 340/469, 665, 666, 667, 425.5
See application file for complete search history.

(56) References Cited

U.S. PATENT DOCUMENTS 6,184,785 B1* 2/2001 Midorikawa ...... B60R 21/01534
280/804
2005/0046561 A1* 3/2005 Inoue ................. B60R 22/48
340/457.1
2006/0238300 A1* 10/2006 Ohtaki ................ B60R 25/04
340/5.72
2007/0078598 A1* 4/2007 Watanabe ............ B60K 37/02
701/429
2008/0122272 A1* 5/2008 Aoki .................. B60N 2/022
297/217.2
2008/0186156 A1* 8/2008 Uematsu ............. B60K 35/00
340/441
2010/0162530 A1* 7/2010 Schramm ........... B60R 22/321
24/166

FOREIGN PATENT DOCUMENTS

| DE | 102004025319 A1 | 12/2005 |
| DE | 202006001069 U1 | 5/2006 |
| EP | 1428733 A1 | 6/2004 |
| JP | 2009-173173 A | 8/2009 |
| JP | 2009-255676 A | 11/2009 |
| JP | 2011-105157 A | 6/2011 |

OTHER PUBLICATIONS

Communication dated Dec. 3, 2015 from the German Patent and Trademark Office in counterpart application No. 102014219319.2.

* cited by examiner

*Primary Examiner* — Daniel Previl
(74) *Attorney, Agent, or Firm* — Sughrue Mion, PLLC

(57) ABSTRACT

A microcomputer performs communication in conformity with the CAN standards to capture seating signals detected by seating sensors and seatbelt fastening signals by buckle switches. If determining from the captured seating signals that there is an unoccupied seat, the microcomputer displays a seatbelt state image at the unoccupied seat position in a vehicle image in gray presentation. If determining that there is an occupied and non-fastened seat, the microcomputer displays the seatbelt state image at the non-fastened seat position in the vehicle image in red presentation and displays the seatbelt state image at an occupied and fastened seat position in black presentation.

4 Claims, 7 Drawing Sheets

71

72

73

SEATBELT FASTENING STATE DISPLAY DEVICE

CROSS-REFERENCE TO RELATED APPLICATIONS

The present application claims priority to and incorporates by reference the entire contents of Japanese Patent Application No. 2013-200255 filed in Japan on Sep. 26, 2013.

BACKGROUND OF THE INVENTION

1. Field of the Invention

The present invention relates to a seatbelt fastening state display device that displays the state of a seatbelt.

2. Description of the Related Art

Some vehicle meters display a warning that informs fastening or non-fastening of a seatbelt in each seat.

As a conventional art of this type, Japanese Patent Application Laid-open No. 2009-255676 suggests that a warning is displayed to inform fastening or non-fastening of a seatbelt in each seat.

In addition, Japanese Patent Application Laid-open No. 2011-105157 suggests that seating is detected in each of rear seats and fastening of a seatbelt is detected in each of rear seats, and if it is not detected that the rear seatbelt is fastened in the rear seat in which seating is detected, a warning is displayed on a unit mounted in the ceiling of the vehicle interior.

However, the seatbelt fastening state display device described in Japanese Patent Application Laid-open No. 2011-105157 has a problem described below. No warning is displayed if neither seating nor fastening of a seatbelt is detected in a seat, and no warning is displayed if seating and fastening of the seatbelt is detected in the seat. Thus, the driver cannot determine only from this mode of warning display whether no occupant is in a seat for which no warning is displayed or an occupant is in the seat and fastens the seatbelt. Accordingly, the driver needs to watch the seat to verify whether an occupant is in the seat.

SUMMARY OF THE INVENTION

The present invention is devised in light of the foregoing circumstances, and an object of the present invention is to provide a seatbelt fastening state display device that allows the driver to visually identify at a glance from the driver's seating or non-seating of seats and fastening or non-fastening of seatbelts.

According to one aspect of the present invention, a seatbelt fastening state display device includes: a seating detecting unit configured to detect whether an occupant sits on a seat; a fastening detecting unit configured to detect whether an occupant fastens a seatbelt provided in the seat; a display unit configured to display various kinds of information; and a control unit configured to control contents of display on the display unit, wherein the control unit causes the display unit to display information on states of the seatbelt, in different display modes corresponding to a first state where the seating detecting unit does not detect seating, a second state where the seating detecting unit detects seating and the fastening detecting unit does not detect fastening of the seatbelt, and a third state where the seating detecting unit detects seating and the fastening detecting unit detects fastening of the seatbelt.

According to another aspect of the present invention, the control unit causes the display unit to display a vehicle image depicting a vehicle as information indicative of the states of the seatbelt, and display a seatbelt state image corresponding to each of the first state, the second state, and the third state, at places corresponding to positions of the seats in the vehicle image.

According to still another aspect of the present invention, in the first state, the control unit causes the seatbelt state image to be displayed in a color with a lower degree of impression as compared to that in the third state, and in the second state, the control unit causes the seatbelt state image to be displayed in a color with a higher degree of impression as compared to those in the first and third states.

According to still another aspect of the present invention, the control unit causes the seatbelt state image to be displayed such that an image depicting a seatbelt overlaps an image depicting an occupant and the image depicting a seatbelt is changed in color between the second state and the third state.

As in the foregoing, the present invention has been briefly described. Further, details of the present invention will be further clearly understood by reading the description on a mode for carrying out the invention (hereinafter, referred to as "embodiment") to be described below in conjunction with the attached drawings.

DETAILED DESCRIPTION OF THE PREFERRED EMBODIMENTS

A seatbelt fastening state display device in an embodiment of the present invention will be described with reference to the drawings. The seatbelt fastening state display device in the embodiment is applied to a graphics meter mounted on an instrument panel at the driver's side in the vehicle interior.

Figure 1:
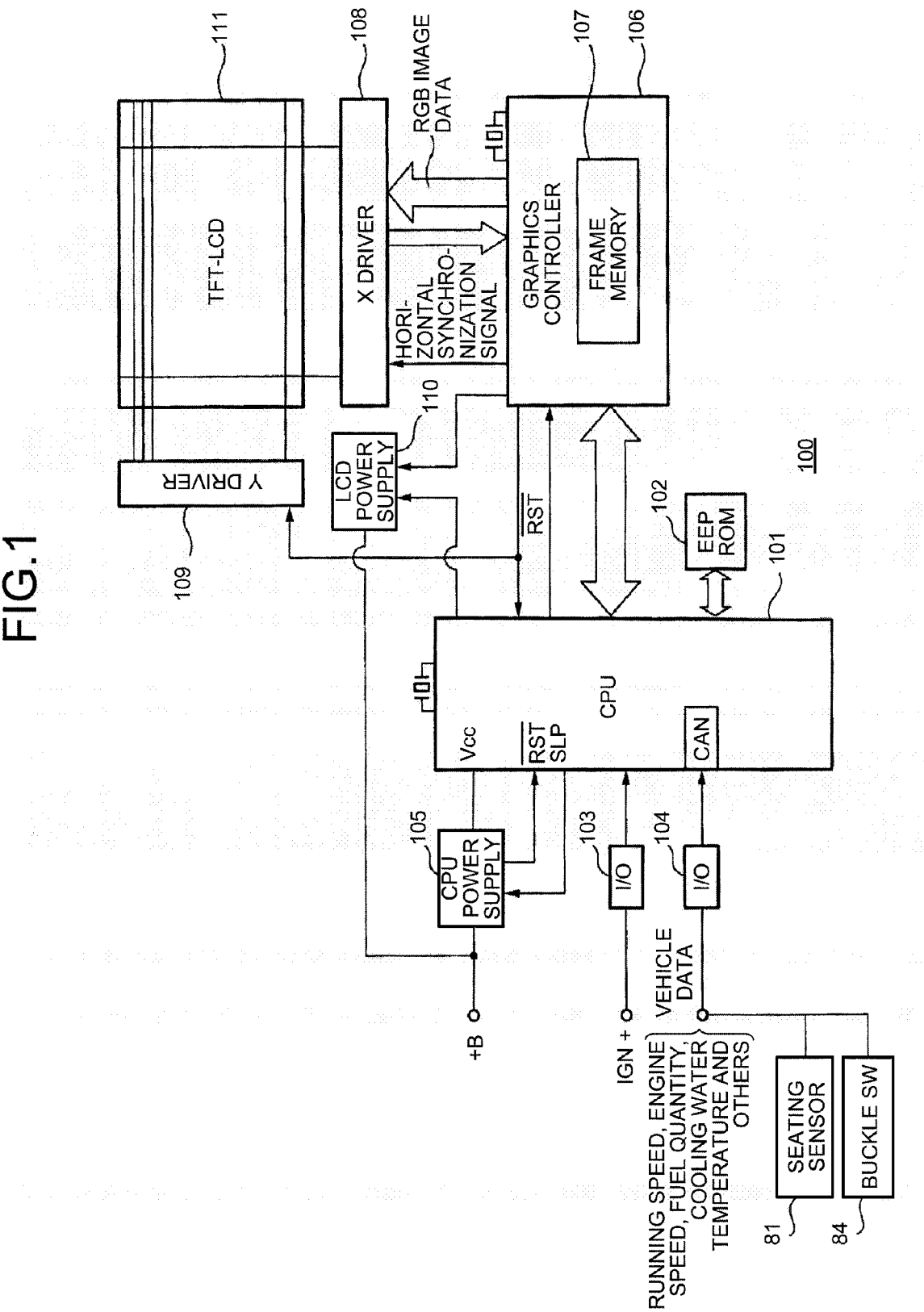
FIG. 1 is a diagram illustrating a hardware configuration of a graphics meter 100 in an embodiment.

FIG. 1 is a diagram illustrating a hardware configuration of a graphics meter 100 in an embodiment. As illustrated in FIG. 1, the graphics meter 100 includes a microcomputer (CPU: Central Processing Unit) 101, a read-only memory (EE-PROM: Electrically Erasable Programmable Read Only Memory) 102, an interface 103, an interface 104, a CPU power supply unit 105, a graphics controller 106, a frame memory 107, an X driver 108, a Y driver 109, an LCD (Liquid Crystal Display) power supply unit 110, and a liquid crystal display (TFT-LCD: Thin Film Transistor Liquid Crystal Display) 111.

The microcomputer (CPU) 101 executes prepared programs and performs various processes necessary for implementation of functionality of the graphics meter 100. For example, the microcomputer 101 (control unit) performs the processes provided in a flowchart described later.

The read-only memory (EEPROM) 102 saves the contents of the programs to be executed by the microcomputer 101, image data such as prepared meter initial images, fixed data, and others.

The interface 103 inputs a signal (IGN+) indicative of the state of a vehicle-side ignition switch to the microcomputer 101.

The interface 104 is used for establishing communication under CAN (Controller Area Network) standards between the microcomputer 101 and various vehicle-side control units (ECUs: Electric Control Units). Specifically, data indicative of the various current vehicle states such as current vehicle running speed, engine rotation speed, fuel quantity, and cooling water temperature, is input as almost real-time data from the vehicle side into the microcomputer 101 via the interface 104.

For example, the interface 104 receives a vehicle speed pulse signal output from a speed sensor mounted at the vehicle side for each predetermined amount of movement of the vehicle, and outputs the value of the current vehicle running speed as running speed information to the microcomputer 101.

In addition, the interface 104 receives a pulse signal output from an engine rotation speed (NE) sensor for detecting the rotation speed of an engine, and outputs the same as engine rotation speed information to the microcomputer 101. The interface 104 also receives information on fuel quantity detected by a fuel sensor, and outputs the same to the microcomputer 101. In addition, the interface 104 receives a signal from a water temperature sensor for detecting the temperature of cooling water in a radiator, and outputs the same as cooling water temperature information to the microcomputer 101.

The interface 104 also receives signals from an seating sensors 81 (seating detecting units) for detecting that a passenger sits in the seat and signals from buckle switches 84 (fastening detecting units) for detecting that the passenger fastens the seatbelt, and outputs the same to the microcomputer 101. The buckle switches 84 are built in buckles of the seatbelts in all of the seats including the driver's seat, the front passenger's seat, the rear right seat, the rear middle seat, and the rear left seat in the vehicle. Each of the buckle switches 84 is turned on by inserting a tongue plate at a leading end of the seatbelt into the buckle, and is turned off by removing the tongue plate from the buckle.

The CPU power supply unit 105 inputs direct-current power supplied from a vehicle-side plus power supply line (+B) to generate a direct-current voltage (Vcc) necessary for operations of the microcomputer 101.

In addition, as necessary, the CPU power supply unit 105 generates a reset signal and performs an operation for suppressing power supply according to a sleep signal output from the microcomputer 101.

The liquid crystal display 111 has a two-dimensional color display screen that is composed of a liquid crystal device and has a large number of micro display cells arranged in X and Y directions. By individually controlling the display states of the large number of micro display cells, it is possible to provide graphics display of various kinds of information such as diagrams, characters, and images, on the two-dimensional display screen.

The liquid crystal display 111 (display unit) provides a graphics display screen (display surface) 111a of the graphics meter (also called simply meter) 100 in two-dimensional screen display form.

Figure 2:
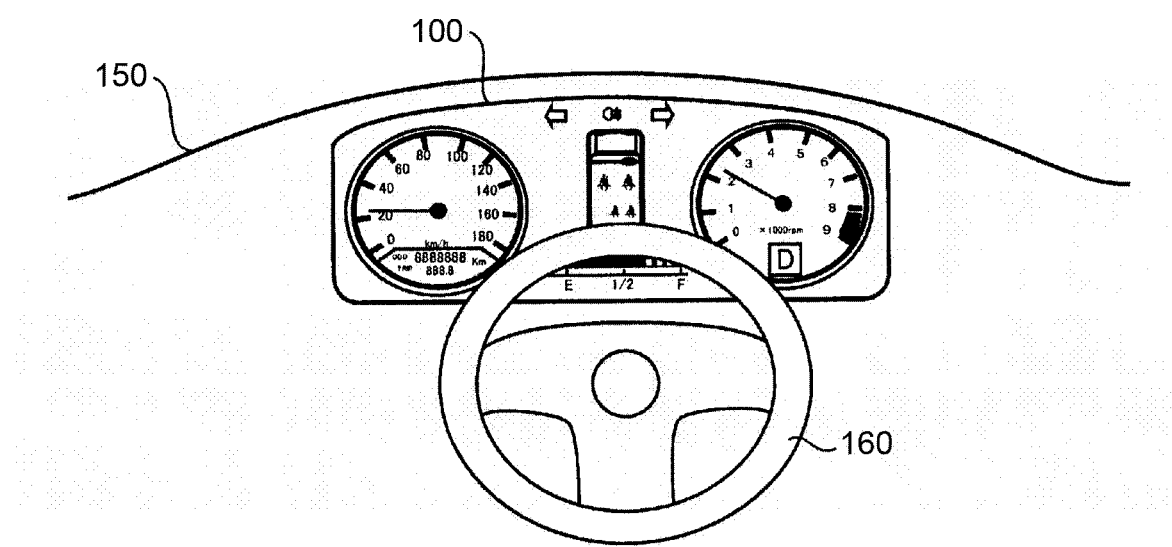
FIG. 2 is a diagram illustrating the neighborhood of the graphics meter 100 mounted on an instrument panel 150 at the driver's side.

FIG. 2 is a diagram illustrating the neighborhood of the graphics meter 100 mounted on the instrument panel 150 at the driver's side. The graphics meter 100 is mounted on the instrument panel 150 opposed to the driver's seat. The driver can view the graphics meter 100 mounted on the instrument panel 150 while gripping a steering wheel 160.

Figure 3:
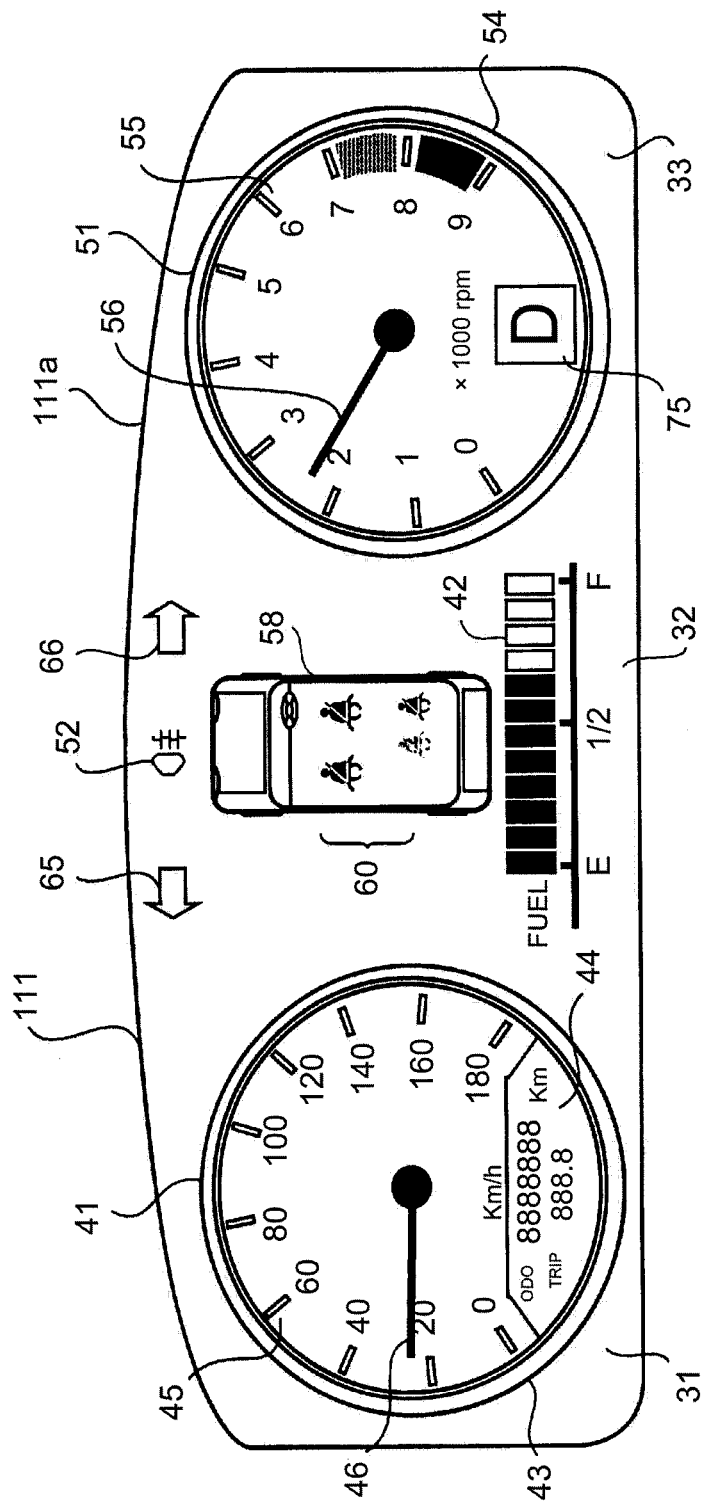
FIG. 3 is a diagram illustrating a graphics display screen 111a provided on a liquid crystal display 111 of the graphics meter 100.

FIG. 3 is a diagram illustrating the graphics display screen 111a provided on the liquid crystal display 111 of the graphics meter 100. The graphics display screen 111a is roughly divided into three different display sections each of which is displayed on a different section: a first display section (left side section of the FIG. 31; a second display section (middle section of the FIG. 32; and a third display section (right side section of the FIG. 33.

The first display section 31 provides a speed meter 41 that indicates the current vehicle running speed. The speed meter 41 has a speed scale 45, an indicating needle 46, a distance meter 44, and an ornamental ring 43. The indicating needle 46 points out a position on the speed scale 45 to indicate the current vehicle running speed.

The second display section 32 displays various images. The second display section 32 displays at the upper part thereof a left winker 65, a right winker 66, and a warning image 52 positioned between them and issues a warning of overheat or the like. In addition, the second display section 32 displays at the middle part thereof a vehicle image 58 and a seatbelt state image 60 in the vehicle image 58.

Figure 4:
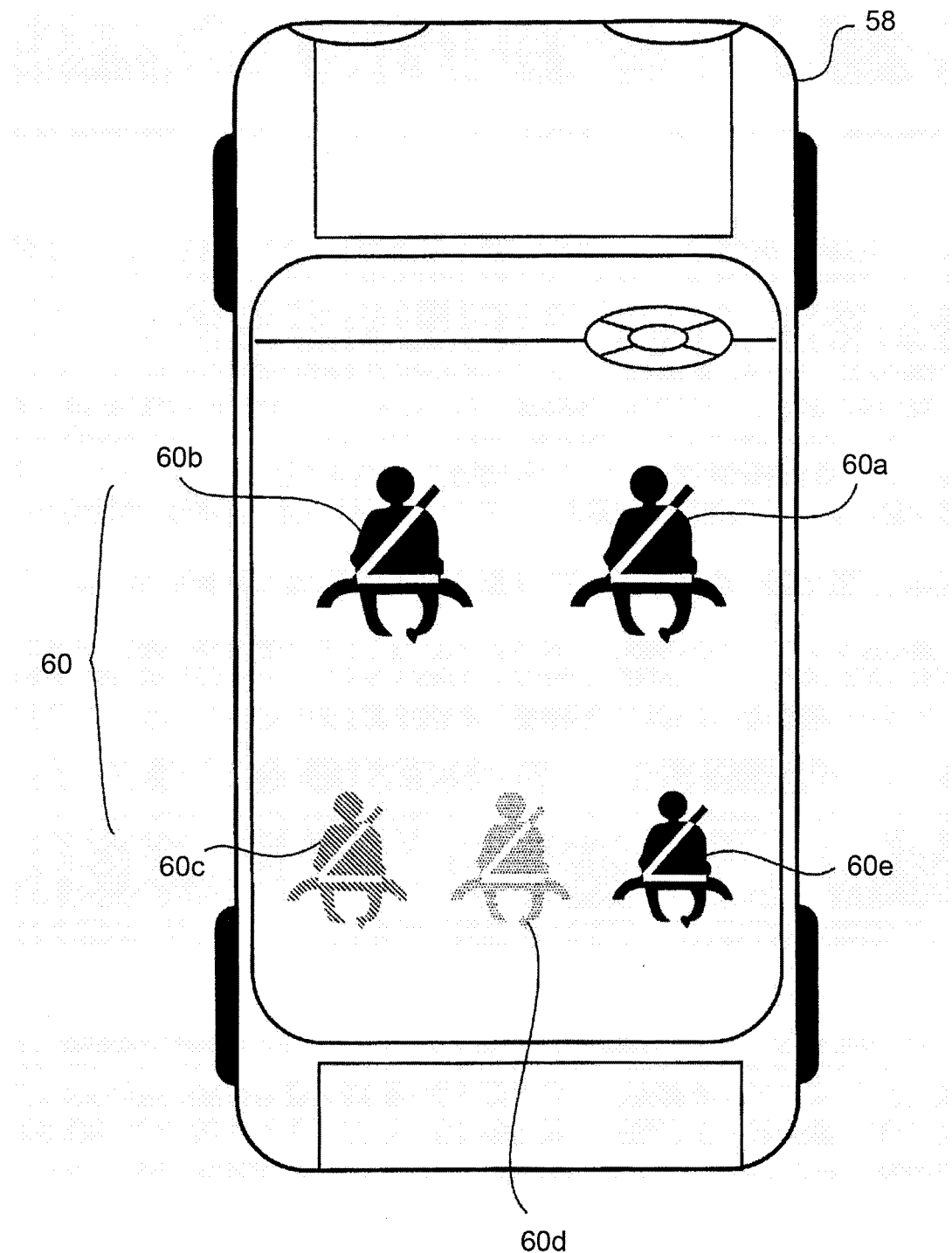
FIG. 4 is a diagram illustrating a seatbelt state image 60 displayed at a place corresponding to a seat position in a vehicle image 58.

FIG. 4 is a diagram illustrating the seatbelt state image 60 displayed at a place corresponding to a seat position in the vehicle image 58. The seatbelt state image 60 includes a driver's seatbelt state image 60a, a front passenger's seatbelt state image 60b, a rear left seatbelt state image 60c, a rear middle seatbelt state image 60d, and a rear right seatbelt state image 60e. The driver's and front passenger's seatbelt state images are displayed in a slightly larger size than that of the rear seatbelt state images. In the case where there is no particular need to discriminate among these seatbelt state images in the following description, they will be referred to as seatbelt state image 60.

Figure 5A:
FIGS. 5A to 5C are diagrams illustrating the relationships between the seatbelt fastening states and the seatbelt state image 60.
Figure 5B:
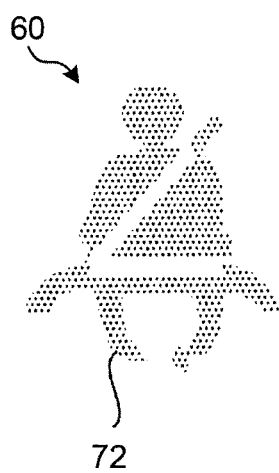
Figure 5C:

FIGS. 5A to 5C are diagrams illustrating the relationships between the seatbelt fastening states and the seatbelt state image 60. The seatbelt state image 60 is provided as an image depicting the state where an occupant (passenger) fastens a seatbelt. The seatbelt state image 60 is displayed in monochrome such that overlapping portions between the seatbelt and the passenger are highlighted.

In the embodiment, there are three display modes for the seatbelt state image described below. When the passenger sits in the seat and fastens the seatbelt (third state), the seatbelt state image 60 is displayed in a black and dark display mode (black presentation) 73 as illustrated in FIG. 5C (black presentation in FIG. 5C). When the passenger does not sit in the seat (first state), as compared to FIG. 5C, the seatbelt state image 60 is displayed in a gray and light display mode (gray presentation) 72 making a lower degree of impression as illustrated in FIG. 5B (halftone pattern in FIG. 5B). When the passenger sits in the seat but does not fasten the seatbelt (second state), as compared to FIGS. 5B and 5C, the seatbelt state image 60 is displayed in a red display mode (red presentation) 71 making a higher degree of impression as illustrated in FIG. 5A (shaded pattern in FIG. 5A). Of course, the colors making certain degrees of impression are not limited to the foregoing ones. For example, the color making a higher degree of impression may be yellow, pink, or the like, and the color making a lower degree of impression may be brown, purple, or the like.

A fuel gauge 42 is displayed directly underneath the vehicle image 58. The fuel gauge 42 is provided in a bar graph form along the horizontal direction that indicates the empty condition (Empty) at the left end and indicates the full-tank condition (Full) at the right end. The bar graph indicates the current remaining fuel quantity by bars displayed in a dark color.

The third display section 33 provides a speed meter 51 that indicates the current engine rotation speed. The speed meter 51 has a rotation speed scale 55, an indicating needle 56, and an ornamental ring 54. The indicating needle 56 points out a position on the rotation speed scale 55 to indicate the current engine rotation speed. In addition, a shift indicator 75 is provided in the ornamental ring 54 as part of the speed meter 51.

The scanning position in the Y direction on the display screen of the liquid crystal display 111 is sequentially switched by an output from the Y driver 109. The Y driver 109 switches sequentially the scanning position in the Y direction, in synchronization with a vertical synchronization signal output from the graphics controller 106.

The X driver 108 switches sequentially the scanning position in the X direction on the display screen of the liquid crystal display 111, in synchronization with a horizontal synchronization signal output from the graphics controller 106. In addition, the X driver 108 controls the contents of display on the screen by providing image data of RGB colors output from the graphics controller 106 to the display cells at the scanning position.

The graphics controller 106 executes a drawing program under various instructions input from the microcomputer 101, and displays various graphic elements on the screen of the liquid crystal display 111. In actuality, the microcomputer 101 or the graphics controller 106 writes display data into the frame memory 107 saving the contents of display of each pixel for graphics drawing.

In addition, the graphics controller 106 generates a vertical synchronization signal and a horizontal synchronization signal for two-dimensional scanning of the screen of the liquid crystal display 111, and provides display data stored in the frame memory 107 at an appropriate address to the liquid crystal display 111 with a timing synchronized to these synchronization signals.

The LCD power supply unit 110 inputs direct-current power supplied from the vehicle-side plus power supply line (+B) to generate predetermined direct-current power necessary for display on the liquid crystal display 111, and supplies the same to the liquid crystal display 111 and others.

Figure 6:
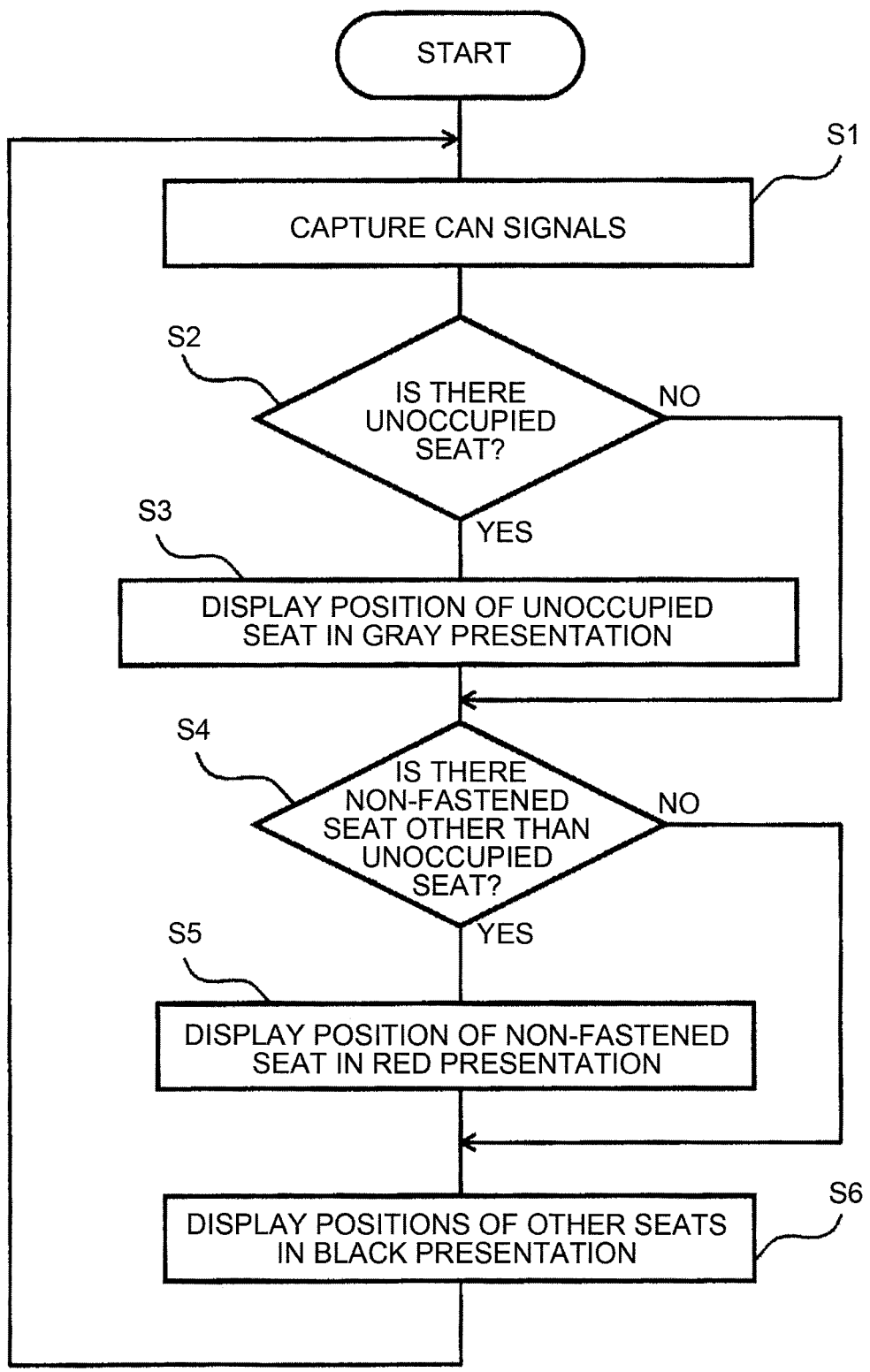
FIG. 6 is a flowchart of a procedure for operations of the graphics meter 100.

Operations of the thus configured graphics meter 100 will be described. FIG. 6 is a flowchart of a procedure for operations of the graphics meter 100. The operation program is stored in the EEPROM 102 and executed by the microcomputer 101. Here, an operation for displaying the seatbelt state image will be described.

The microcomputer 101 performs communication in conformity with the CAN standards to capture seating signals detected by the seating sensors 81 and signals indicative of fastening or non-fastening of the seatbelts detected by the buckle switches 84 (step S1).

The microcomputer 101 determines whether there is an unoccupied seat based on the captured seating signals (step S2). If there is no unoccupied seat, the microcomputer 101 moves to step S4. Meanwhile, if there is an unoccupied seat, the microcomputer 101 displays the seatbelt state image 60 at the unoccupied seat position in the vehicle image 58, in the gray presentation 72 (first state) (step S3).

The microcomputer 101 determines whether there is a non-fastened seat other than the unoccupied seat (occupied seat) (step S4). If there is a non-fastened seat, the microcomputer 101 displays the seatbelt state image 60 at the non-fastened seat position in the vehicle image 58 in the red presentation 71 (second state) (step S5).

Meanwhile, the microcomputer 101 displays the seatbelt state image 60 at another seat position in the vehicle image 58, that is, at an occupied and fastened seat position, in the black presentation 73 (third state) (step S6). After that, the microcomputer 101 returns to step S1.

According to the graphics meter 100 in the embodiment, when there is an occupied and non-fastened seat, the seatbelt state image 60 is displayed in the red presentation 71 on the graphics meter 100 mounted on the instrument panel 150 opposed to the driver's seat. This allows the driver to visually identify at a glance from the driver's seating or non-seating of the seats and fastening or non-fastening of the seatbelts. Therefore, the driver can conduct safety confirmation without having to change his/her posture.

In addition, the seatbelt state image is displayed at places corresponding to the positions of the seats in the vehicle image. Thus, the driver can easily grasp the states of the seatbelts in the positions of the vehicle interior associated with the vehicle image.

Further, if there is no seating, the seatbelt state image is displayed in a color making a lower degree of impression, and if there is seating and non-fastened seatbelt, the seatbelt state image is displayed in a color making a higher degree of impression, which makes it possible to enhance the effect of visual check.

The present invention is not limited to the foregoing configuration of the embodiment but can be applied to any configuration achieving the same functionality as that in the configuration of the embodiment.

Figure 7A:
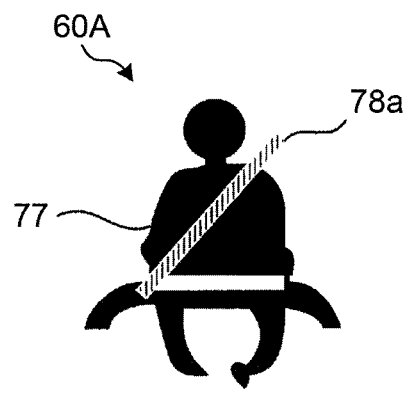
FIGS. 7A and 7B are diagrams illustrating a seatbelt state image 60A in a modified example.
Figure 7B:
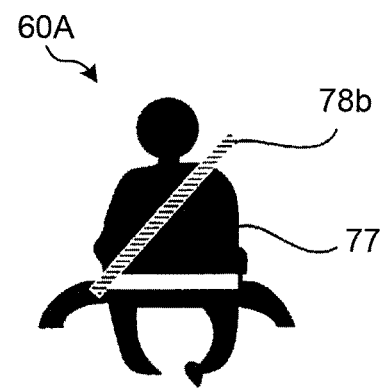

For example, in the foregoing embodiment, the seatbelt state image is displayed in monochrome (single-color display) as an image depicting the state where a passenger fastens a seatbelt, but the display mode is not limited to this. FIGS. 7A and 7B are diagrams illustrating a seatbelt state image 60A in a modified example. In the modified example, the seatbelt state image is displayed in two separate display modes, that is, the seatbelt image is displayed in different colors to allow the driver to visually identify the seatbelt state image indicative of the seated and non-fastened state and the seatbelt state image indicative of the seated and fastened state.

The seatbelt state image 60A indicative of the occupied and fastened state illustrated in FIG. 7A is represented such that a green image (vertically-striped pattern in the drawing) 78a depicting a seatbelt overlaps an image 77 depicting a passenger. The seatbelt state image 60A indicative of the seated and non-fastened state illustrated in FIG. 7B is represented such that a red image (horizontally-striped pattern in the drawing) 78b depicting a seatbelt overlaps the image 77 depicting a passenger. Employing these display modes makes it possible to emphasize the seatbelt section in the image.

In addition, the seatbelt state image indicative of the seated and non-fastened state may be displayed in the red presentation and in a larger size than that of the other seatbelt state images. This further facilitates visual identification.

In addition, the seatbelt state image indicative of the seated and non-fastened state can be displayed in other display modes. For example, the seatbelt state image may be simply displayed with the mark "x" laid thereon. Alternatively, the seatbelt state image may be displayed, for example, such that a portion overlapping the image of the passenger is hidden and only the image of the passenger is displayed to clearly show that the passenger does not fasten the seatbelt.

In addition, the seatbelt state image indicative of the seated and fastened state may be displayed in blue.

In the foregoing embodiment, the seatbelt state image is displayed at seat positions arranged inside the vehicle image. Alternatively, the seat positions may be displayed in text form without the use of the vehicle image.

In addition, in the foregoing embodiment, the seatbelt state image is displayed within the graphics meter. Alternatively, the seatbelt state image may be displayed on the LCD (indicator) in the analog meter or in such a manner that light is transmitted from a back light source such as LED to a printed design screen for display.

The present invention provides advantageous display of seatbelt states which allows the driver to visually identify from the driver's seating or non-seating of seats and fastening or non-fastening of seatbelts.

The features of the foregoing embodiment of the seatbelt fastening state display device according to the present invention will be briefly listed as [1] to [4].

[1] A seatbelt fastening state display device including:
a seating detecting unit (seating sensor 81) configured to detect whether an occupant sits on a seat;
a fastening detecting unit (buckle SW84) configured to detect whether an occupant fastens a seatbelt provided in the seat;
a display unit (liquid crystal display 111) configured to display various kinds of information; and
a control unit (microcomputer 101) configured to control contents of display on the display unit, wherein
the control unit causes the display unit to display information on states of the seatbelt, in different display modes corresponding to a first state where the seating detecting unit does not detect seating, a second state where the seating detecting unit detects seating and the fastening detecting unit does not detect fastening of the seatbelt, and a third state where the seating detecting unit detects seating and the fastening detecting unit detects fastening of the seatbelt.

[2] The seatbelt fastening state display device according to [1], wherein
the control unit causes the display unit to display a vehicle image (58) depicting a vehicle as information indicative of the states of the seatbelt, and display a seatbelt state image (60) corresponding to each of the first state, the second state, and the third state, at places corresponding to positions of the seats in the vehicle image.

[3] The seatbelt fastening state display device according to [2], wherein
in the first state, the control unit causes the seatbelt state image to be displayed in a color with a lower degree of impression as compared to that in the third state, and
in the second state, the control unit causes the seatbelt state image to be displayed in a color with a higher degree of impression as compared to those in the first and third states.

[4] The seatbelt fastening state display device according to [2], wherein
the control unit causes the seatbelt state image to be displayed such that an image depicting a seatbelt overlaps an image depicting an occupant and the image depicting a seatbelt is changed in color between the second state and the third state.

According to the seatbelt fastening state display device according to the above aspects, in the case where there exists an occupied seat in which the occupant does not fasten the seatbelt, information on the fastening state of the seatbelt is displayed on a display unit in a display mode different from those in other cases.

According to the present invention, in the case where there exists an occupied seat in which the occupant does not fasten the seatbelt, information on the state of the seatbelt is displayed on the display unit in a display mode different from those in other cases. This allows the driver to visually identify at a glance from the driver's seating or non-seating of the seats and fastening or non-fastening of the seatbelts. Therefore, the driver can conduct safety confirmation without having to change his/her posture.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A seatbelt fastening state display device comprising:
a seating detecting unit configured to detect whether an occupant sits on a seat;
a fastening detecting unit configured to detect whether a seatbelt provided in the seat is fastened;
a display unit configured to display various kinds of information; and
a control unit configured to control contents of display on the display unit, wherein
the control unit causes the display unit to display a plurality of seatbelt state images depending on a state of the seatbelt, such that a first seatbelt state image is displayed when the seating detecting unit does not detect seating, a second seatbelt state image is displayed when the seating detecting unit detects seating and the fastening detecting unit does not detect fastening of the seatbelt, and a third seatbelt state image is displayed when the seating detecting unit detects seating and the fastening detecting unit detects fastening of the seatbelt.

2. The seatbelt fastening state display device according to claim 1, wherein
the control unit causes the display unit to display a vehicle image depicting a vehicle as information indicative of the state of the seatbelt, and to display one of the plurality of seatbelt state images in the vehicle image at a position corresponding to a position of the seat.

3. The seatbelt fastening state display device according to claim 2, wherein
the first seatbelt state image is displayed in a color with a lower degree of impression than the third seatbelt state image, and
the second seatbelt state image is displayed in a color with a higher degree of impression than the first and third seatbelt state images.

4. The seatbelt fastening state display device according to claim 2, wherein
the control unit causes each of the plurality of seatbelt state images to be displayed such that an image depicting a seatbelt overlaps an image depicting an occupant and the image depicting a seatbelt is changed in color between the second state and the third state.

* * * * *